Figure 1:
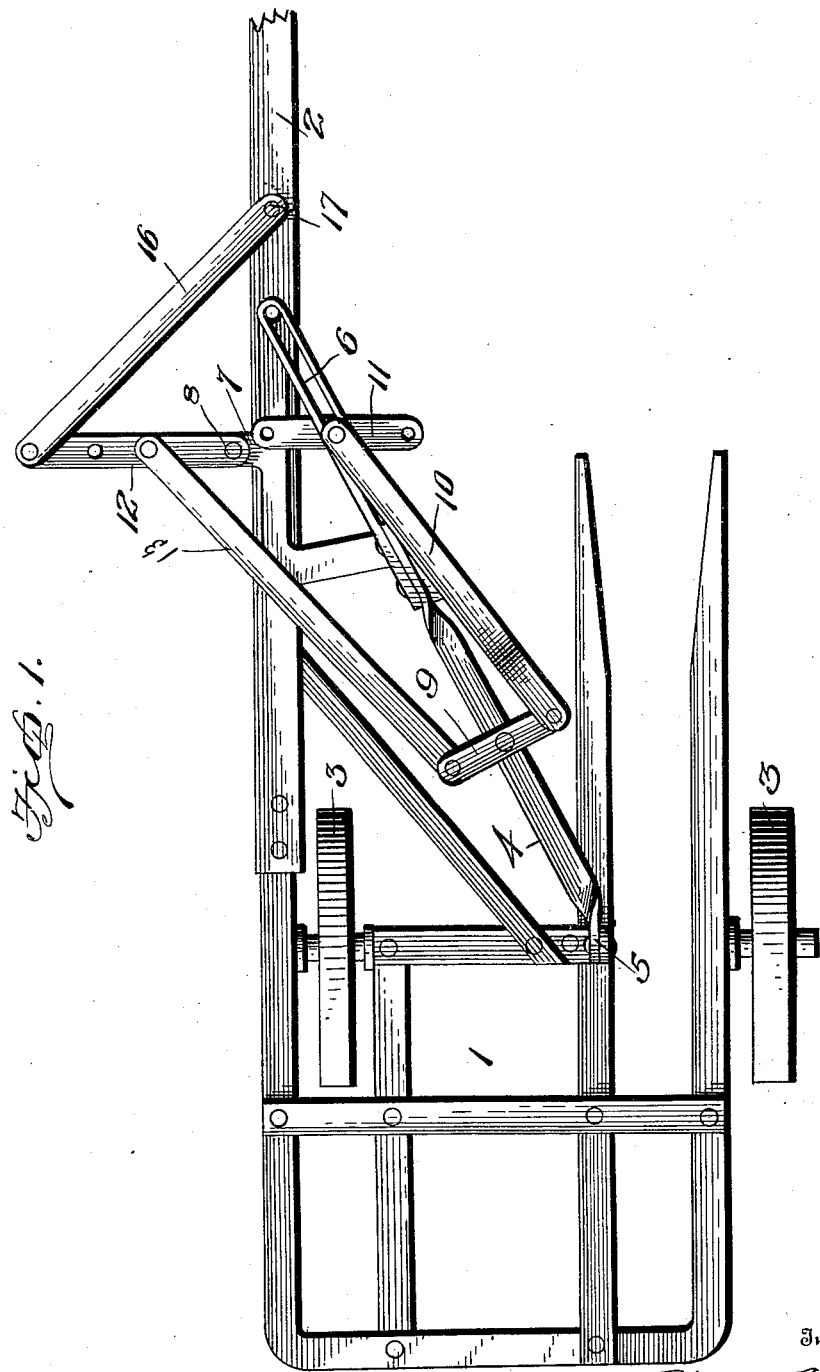

No. 686,586. Patented Nov. 12, 1901.
H. C. BURK.
DRAFT EQUALIZER.
Application filed May 6, 1901.

(No Model.) 2 Sheets—Sheet 1.

Witnesses
Inventor
H. C. Burk
By H. B. Wilson & Co.
Attorneys

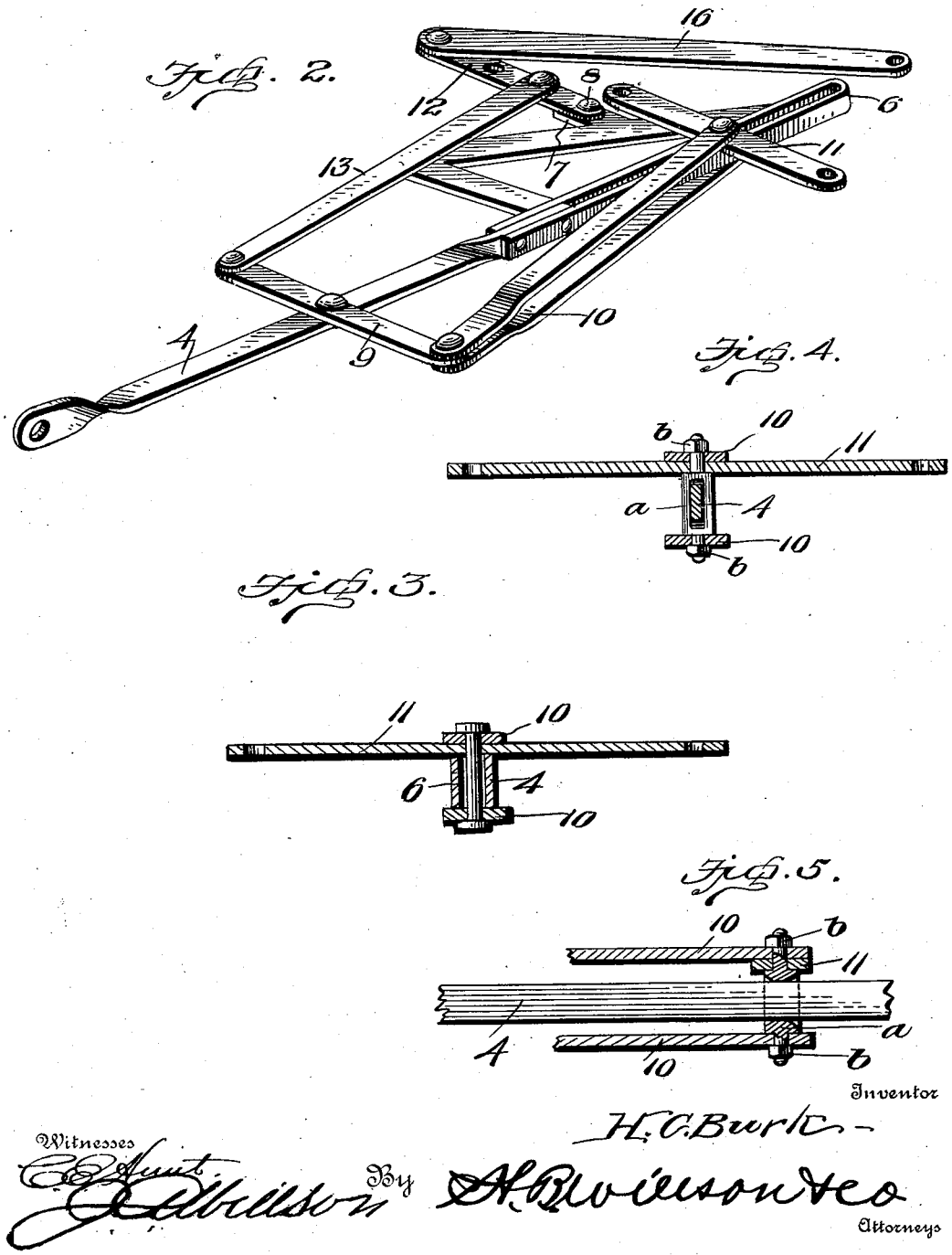

UNITED STATES PATENT OFFICE.

HOLMES CONOVER BURK, OF BURLINGAME, KANSAS.

DRAFT-EQUALIZER.

SPECIFICATION forming part of Letters Patent No. 686,586, dated November 12, 1901.

Application filed May 6, 1901. Serial No. 58,933. (No model.)

*To all whom it may concern:*

Be it known that I, HOLMES CONOVER BURK, a citizen of the United States, residing at Burlingame, in the county of Osage and State of Kansas, have invented certain new and useful Improvements in Draft Eveners or Equalizers; and I do declare the following to be a full, clear, and exact description of the invention, such as will enable others skilled in the art to which it appertains to make and use the same.

The invention relates to a draft evener or equalizer particularly designed for agricultural machinery, such as corn-harvesters; and the object of the invention is to provide a device of this character which shall be simple of construction, durable in use, and comparatively inexpensive of production and which will relieve to a minimum the objectionable side draft experienced in agricultural machines.

With these and other objects in view the invention consists of certain novel features of construction, combination, and arrangement of parts, which will be hereinafter more fully described, and particularly pointed out in the appended claims.

In the accompanying drawings, Figure 1 is a plan view illustrating conventionally or in outline the McCormick corn-harvester, showing my invention applied thereto. Fig. 2 is a detail perspective view of the equalizer or evener removed; and Fig. 3 is a vertical cross-sectional view through the draft-bar, the doubletree, and the links connected to the doubletree. Fig. 4 is a vertical sectional view through a modified form of draw-bar, illustrating the manner of connecting it to the pair of links; and Fig. 5 is a similar view, taken at right angles to Fig. 1, to more clearly show the construction of bolt used in this modified form.

In the drawings, 1 denotes in skeleton the frame of a McCormick corn-harvester, 2 the tongue or pole, and 3 the supporting-wheels.

My improved draft-equalizer consists of a draw-bar 4, the rear end of which is connected to a stud 5, projecting upwardly from the frame of the harvester, the forward end of which is formed with a longitudinal slot 6.

7 denotes an angular brace having a laterally-projecting stud 8.

9 denotes a lever pivoted to the draw-bar intermediate its ends, and 10 denotes a pair of links pivoted at their rear ends to one end of the lever and having their forward ends lying on opposite sides of the slotted draw-bar and pivoted by a bolt extending through said slotted draw-bar and a doubletree 11.

12 denotes a singletree pivoted at one end to the stud 8 and intermediate its ends to the forward end of a link 13, the rear end of which is pivoted to the outer end of the lever aforesaid. A link 16 is pivoted to the extreme outer end of this singletree and releasably connected to the tongue or pole at 17, so that when only two horses are used the singletree may be locked against movement, whereas if three horses should be used two may be attached to the doubletree and one to the singletree.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof. For instance, instead of constructing the draft-bar 4 with a longitudinal slot at its outer end for the bolt which connects the doubletree to the links to ride in said bar may be constructed as shown in Figs. 4 and 5—that is, of a solid unslotted piece—and the bolt *a* may be provided with a slot for the bar to extend through, thus permitting the doubletree 11 to move back and forth in the same manner as in the construction shown in Figs. 1 and 2. The body of the bolt in which the slot is formed is of much greater diameter than the ends, and the ends are provided with nuts *b* for holding the link 10 in place.

Having thus described my invention, what I claim, and desire to secure by Letters Patent, is—

1. In a draft-equalizer, the combination with the fixed draw-bar, of a lever pivoted thereto intermediate its ends, a doubletree having a sliding engagement with the said draw-bar, links connected to the doubletree and to the lever, a singletree and links connecting the singletree to the lever, substantially as set forth.

2. In a draft-equalizer, the combination with the draw-bar provided with a slotted forward end, of a lever pivoted intermediate its ends to the draw-bar, a doubletree, links, a bolt passed through the doubletree and links and through the slotted end of the draw-bar, said links being connected at their rear ends to the lever, an angular brace secured to the forward end of the draw-bar, a singletree pivoted to the angular brace, and links connecting the opposite end of the lever to the singletree, substantially as set forth.

In testimony whereof I have hereunto set my hand in presence of two subscribing witnesses.

HOLMES CONOVER BURK.

Witnesses:
A. L. WILSON,
C. S. WILSON.